United States Patent
Osamoto et al.

(10) Patent No.: US 9,071,844 B2
(45) Date of Patent: Jun. 30, 2015

(54) MOTION ESTIMATION WITH MOTION VECTOR PENALTY

(75) Inventors: Akira Osamoto, Ibaraki (JP); Toshio Takamizawa, Ibaraki (JP)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 2852 days.

(21) Appl. No.: 11/305,504

(22) Filed: Dec. 16, 2005

(65) Prior Publication Data

US 2007/0140345 A1 Jun. 21, 2007

(51) Int. Cl.
| | |
|---|---|
| H04N 7/12 | (2006.01) |
| H04B 14/04 | (2006.01) |
| H03K 7/10 | (2006.01) |
| H04N 19/51 | (2014.01) |
| H04N 19/56 | (2014.01) |

(52) U.S. Cl.
CPC ............... *H04N 19/51* (2014.11); *H04N 19/56* (2014.11)

(58) Field of Classification Search
USPC ............... 375/240.1, 240.2; 702/22; 708/200; 382/236
See application file for complete search history.

(56) References Cited

U.S. PATENT DOCUMENTS

| | | | | |
|---|---|---|---|---|
| 5,703,966 | A * | 12/1997 | Astle | 382/236 |
| 5,719,630 | A * | 2/1998 | Senda | 375/240.17 |
| 6,629,039 | B1 * | 9/2003 | Wang | 702/22 |
| 6,891,891 | B2 * | 5/2005 | Pau et al. | 375/240.16 |
| 6,944,224 | B2 * | 9/2005 | Zhao et al. | 375/240.16 |
| 7,558,428 | B2 * | 7/2009 | Shen et al. | 382/236 |
| 7,627,622 | B2 * | 12/2009 | Conrad et al. | 708/200 |
| 7,720,148 | B2 * | 5/2010 | Au et al. | 375/240.12 |
| 2004/0233990 | A1 * | 11/2004 | Sekiguchi et al. | 375/240.16 |
| 2005/0025249 | A1 * | 2/2005 | Zhao et al. | 375/240.24 |
| 2006/0083309 | A1 * | 4/2006 | Schwarz et al. | 375/240.16 |

\* cited by examiner

*Primary Examiner* — Akwasi M Sarpong
(74) *Attorney, Agent, or Firm* — Robert D. Marshall, Jr.; Frank D. Cimino

(57) ABSTRACT

The MPEG motion estimation process is improved by the introduction of the motion vector penalty. The motion vector employed to encode a macroblock takes into consideration the number of bits needed to encode the macroblock with the selected motion vector. This consideration includes a sum of the residual error and the cost to encode the candidate motion vector. This provides an optimization of the bit allocation and vector type selection. This optimization results in a significantly improved picture quality.

4 Claims, 4 Drawing Sheets

MOTION ESTIMATION WITH MOTION VECTOR PENALTY

TECHNICAL FIELD OF THE INVENTION

The technical field of this invention is digital video compression.

BACKGROUND OF THE INVENTION

Recent progress in digital technology has made the widespread use of compressed digital video signals practical. Standardization has been very important in the development of common compression methods used in new services and products now possible. This allows the new services to interoperate and encourages the investment in integrated circuits to make the technology affordable.

MPEG (Moving Picture Experts Group) was founded in 1988 as a working group within ISO/IEC (International Standardization Organization/International Electrotechnical Commission) with the aim of defining standards for digital compression of audio-visual signals. MPEG's first standard, MPEG-1, was published in 1993 as ISO/IEC 11172. It is a three-part standard defining audio and video compression coding methods and a multiplexing system for interleaving audio and video data so that they can be played back together. MPEG-1 principally supports video coding up to about 1.5 Mbits/sec giving quality similar to VHS and stereo audio at 192 bit/sec. It is used in the CD-i (CD-interactive) and Video-CD systems for storing video and audio on CD-ROM.

During 1990, MPEG recognized the need for a second, related standard for coding video for broadcast formats at higher data rates. The MPEG-2 standard can code standard-definition television at bit rates from about 3 to 15 Mbits/sec and high-definition television at 15 to 30 Mbits/sec. MPEG-2 extends the stereo audio capabilities of MPEG-1 to multi-channel surround sound coding. MPEG-2 decoders can also decode MPEG-1 bitstreams.

The MPEG-2 standard is a generic video coding system supporting a diverse range of applications. Different algorithmic tools, developed for many applications, have been integrated into the full standard. To implement all the features of the standard in all decoders is unnecessarily complex and a waste of bandwidth, so a small number of subsets of the full standard, known as profiles and levels, have been defined. A profile is a subset of algorithmic tools and a level identifies a set of constraints on parameter values (such as picture size and bit rate). A decoder which supports a particular profile and level is only required to support the corresponding subset of the full standard and set of parameter constraints.

Television services in the United States broadcast video at a frame rate of slightly less than 30 Hz. Each frame consists of two interlaced fields, giving a field rate of slightly less than 60 Hz. The first field of each frame contains only the odd numbered lines of the frame (numbering the top frame line as line 1), and the second field contains only the even numbered lines of the frame. It is important to note that one interlaced frame contains fields from two instants in time.

In video systems other than television, non-interlaced video is commonplace (for example, most computers output non-interlaced video). In non-interlaced video, all the lines of a frame are sampled at the same time. Non-interlaced video is also termed progressively scanned or sequentially scanned video.

The red, green and blue (RGB) signals commonly used can be equivalently expressed as luminance (Y) and chrominance (UV) components. The chrominance bandwidth may be reduced relative to luminance without significantly affecting the picture quality. For standard definition video, CCIR (Consultative Committee for International Radio) 601 defines how the component (YUV) video signals can be sampled and digitized to form discrete pixels. The terms 4:2:2 and 4:2:0 are often used to describe the sampling structure of the digital picture. 4:2:2 means the chrominance is horizontally subsampled by a factor of two relative to the luminance; 4:2:0 means the chrominance is horizontally and vertically subsampled by a factor of two relative to the luminance.

Using 8 bits for each Y, U or V pixel, the uncompressed bit rate is over 150 Mbits/sec.

MPEG-2 is capable of compressing the bit rate of standard-definition 4:2:0 video down to about 3 to 15 Mbits/sec. At the lower bit rates in this range, the artifacts introduced by the MPEG-2 coding and decoding process are objectionable.

In order to improve encoded quality, an additional pre-filtering step is usually implemented at the input to the encoder. The purpose of the pre-filter is to reduce or eliminate any high frequency noise that may be present in the input video source. If present, such noise would degrade the performance of the video encoder because the encoder would waste available bits attempting to encode the noise.

In low bit rate applications, pre-filtering is also used to reduce the high frequency components of the source video to prevent blocking, ringing and mosquito noise in the decoder. Blocking noise is noise artifacts at the encoded block boundaries, while ringing and mosquito noise is usually due to excess high frequency components and is evident within the encoded blocks.

The pre-filter is usually implemented as a low pass filter. The amount of filtering is critical, as too much filtering will degrade the overall image quality.

SUMMARY OF THE INVENTION

This invention introduces the concept of the motion vector penalty to the MPEG motion estimation process. The resulting quality improvement of this invention of the encoded picture is achieved by correcting the balance of the bit allocation between DCT coefficients and motion vectors, optimizing the distribution of motion vector types and increasing the number of skipped macroblocks.

BRIEF DESCRIPTION OF THE DRAWINGS

These and other aspects of this invention are illustrated in the drawings, in which.

DETAILED DESCRIPTION OF PREFERRED EMBODIMENTS

Video compression systems operate by removing redundant information from the signal at the coder prior to transmission and re-inserting it at the decoder. A coder and decoder pair is referred to as a codec. In video signals, two distinct kinds of redundancy can be identified: spatial and temporal redundancy; and psycho-visual redundancy.

Pixel values are not independent, but are correlated with their neighbors both within the same frame and across frames. So the value of a pixel is predictable to some extent given the values of neighboring pixels. This is known as spatial and temporal redundancy.

The human eye has a limited response to fine spatial detail, and is less sensitive to detail near object edges or around scene changes. Consequently, some artifacts introduced into the decoded picture by the bit rate reduction process may not be visible to the human eye. This is known as psycho visual redundancy.

Two of the main approaches employed in MPEG codecs are intra-frame Discrete Cosine Transform (DCT) coding and motion-compensated inter-frame prediction.

Figure 1:
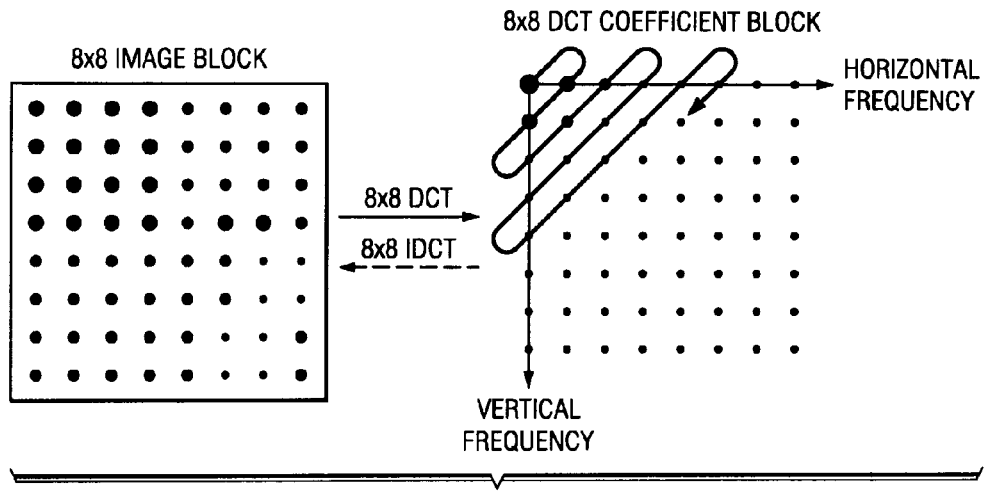
FIG. 1 shows the DCT/IDCT scanning in MPEG (prior art)

In Intra-frame DCT coding a two-dimensional DCT is performed on small blocks (typically 8 by 8 pixels) of each component of the picture to produce blocks of DCT coefficients as shown in FIG. 1. The magnitude of each DCT coefficient indicates the contribution of a particular combination of horizontal and vertical spatial frequencies to the original picture block. The coefficient corresponding to zero horizontal and vertical frequency is called the DC coefficient. In FIG. 1, the pixel value and DCT coefficient magnitude are represented by dot size.

The DCT doesn't directly reduce the number of bits required to represent the block. In fact for an 8 by 8 block of 8 bit pixels, the DCT produces an 8 by 8 block of 11 bit coefficients (the range of coefficient values is larger than the range of pixel values.) The reduction in the number of bits follows from the observation that, for typical blocks from natural images, the distribution of coefficients is non-uniform. The transform tends to concentrate the energy into the low-frequency coefficients and many of the other coefficients are near-zero. The bit rate is reduced by not transmitting the near-zero coefficients and by quantizing and coding the remaining coefficients as described below. The non-uniform coefficient distribution is a result of the spatial redundancy present in the original image block.

The function of the coder is to transmit the DCT block to the decoder, in a bit rate efficient manner, so that it can perform the inverse transform to reconstruct the image. It has been observed that the numerical precision of the DCT coefficients may be reduced while still maintaining good image quality at the decoder. Quantization is used to reduce the number of possible values to be transmitted, reducing the required number of bits.

The degree of quantization applied to each coefficient is weighted according to the visibility of the resulting quantization noise to a human observer. In practice, this results in the high-frequency coefficients being more coarsely quantized than the low-frequency coefficients. Note that the quantization noise introduced by the coder is not reversible in the decoder, making the coding and decoding process lossy.

The serialization and coding of the quantized DCT coefficients exploits the likely clustering of energy into the low-frequency coefficients and the frequent occurrence of zero-value coefficients. The block is scanned in a diagonal zigzag pattern as shown in FIG. 1 starting at the DC coefficient to produce a list of quantized coefficient values, ordered according to the scan pattern.

The list of values produced by scanning is entropy coded using a variable-length code (VLC). Each VLC code word denotes a run of zeros followed by a non-zero coefficient of a particular level. VLC coding recognizes that short runs of zeros are more likely than long ones and small coefficients are more likely than large ones. The VLC allocates code words which have different lengths depending upon the probability with which they are expected to occur. To enable the decoder to distinguish where one code ends and the next begins, the VLC has the property that no complete code is a prefix of any other. Using this technique frequently used code words are represented by fewer bits than infrequently used code words. This results in a reduction of the data needed to transmit the picture information.

FIG. 1 shows the zigzag scanning process, using the scan pattern common to both MPEG-1 and MPEG-2. MPEG-2 has an additional alternate scan pattern intended for scanning the quantized coefficients resulting from interlaced source pictures.

Motion-compensated inter-frame prediction exploits temporal redundancy by attempting to predict a frame to be coded from a previous reference frame. The prediction cannot be based on a source picture because the prediction has to be repeatable in the decoder, where the source pictures are not available. The decoded pictures are not identical to the source pictures because the bit rate reduction process introduces small distortions into the decoded picture. Consequently, the coder contains a local decoder which reconstructs pictures exactly as they would be in the decoder, from which predictions can be formed.

The simplest inter-frame prediction of the block being coded assumes that the co-sited (i.e. the same spatial position) block is the same as the reference picture. Naturally this makes a good prediction for stationary regions of the image, but is poor in moving areas. A more sophisticated method, known as motion-compensated inter-frame prediction, offsets any motion occurring between the block being coded and the reference frame and uses a shifted block from the reference frame for the prediction.

One method of determining the motion occurring between the block being coded and the reference frame is a block-matching search in which a large number of trial offsets are tested by the coder using the luminance component of the picture. The best offset is selected on the basis of minimum error between the block being coded and the prediction block.

The bit rate overhead of using motion-compensated prediction is the data needed to transmit the motion vectors required to predict each block in the decoder. For example, using MPEG-2 to compress standard-definition video to 6 Mbits/sec, the motion vector overhead could account for about 2 Mbits/sec during a picture making heavy use of motion-compensated prediction.

In an MPEG-2 system, the DCT and motion-compensated inter-frame prediction may be combined, as shown in FIG. 2. The coder subtracts the motion-compensated prediction from the source picture to form a prediction error picture. The prediction error is transformed with the DCT, the coefficients are quantized and these quantized values coded using a VLC. The coded luminance and chrominance prediction error is combined with side information required by the decoder, such as motion vectors and synchronizing information, and formed into a bit stream for transmission.

Figure 2A:
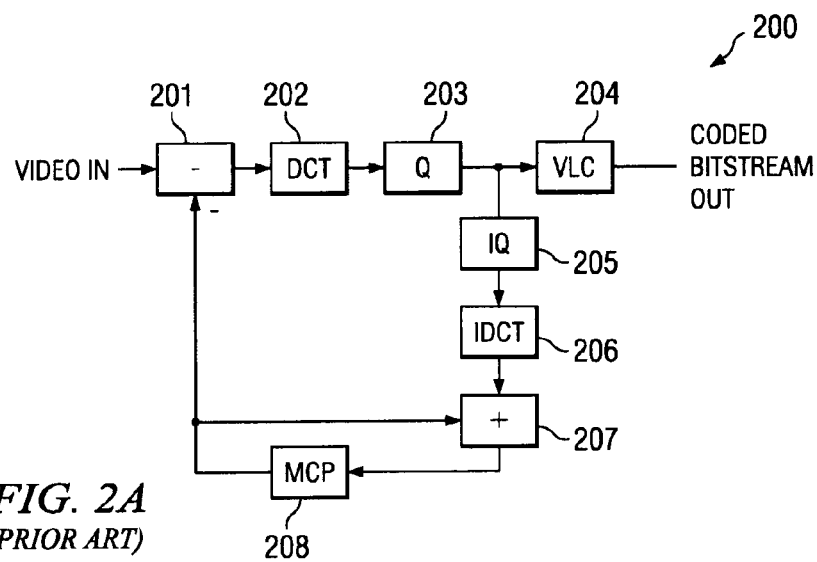
FIG. 2a is a block diagram of a prior art MPEG coder.

FIG. 2a illustrates the encoding process 200 of video encoding according to the prior art. Many video encoding standards use similar processes such as represented in FIG. 2. Encoding process 200 begins subtraction of the motion compensated predictive frame or field from the video input in subtrator 201. This will be further detailed below. DCT transform block 202 transforms the residual error of a macroblock of the pixel data into the spatial frequency domain. This frequency domain data is quantized in quantization block 203. This quanitzation typically takes into account the range of data values for the current macroblock. Thus differing macroblocks may have differing quantizations. The quantized data is encoded by variable length coding block 204. Variable length coding employs fewer bits to encode more frequently used symbols and more bits to encode less frequency used symbols. This process reduces the amount of encoded that must be transmitted and/or stored. The resulting entropy encoded data is the coded bitstream output.

Motion compensation prediction block 208 determines the positions and motion vectors of moving objects within the picture. The resulting motion compensated data is supplied to subtractor 201. Subtractor 201 subtracts the motion compensated data from the input data. Thus frequency transform block 202, quantization block 203 and variable length coding block 204 encode the differential data rather than the original data. Assuming there is relatively little change from frame to frame, this differential data has a smaller magnitude than the raw frame data. Thus this can be expressed in fewer bits contributing to data compression. This is true even if motion compensation prediction block 208 finds no moving objects to code. Inverse quantization block 205, inverse DCT block 206 and adder 207 insure that motion compensation prediction block 208 operates on the reconstructed video input data to match processes employed during decoding.

Figure 2B:
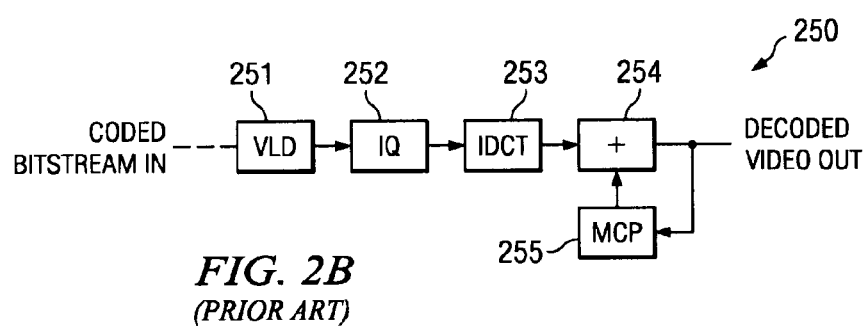
FIG. 2b is a block diagram of a prior art MPEG decoder.

FIG. 2b illustrates the corresponding decoding process 250. Variable length decode unit 251 receives the encoded bitstream input. Variable length decode unit 251 recovers the symbols from the variable length encoding of variable length coding unit 204. Inverse quantization block 252 receives the quantized data from variable length decode unit 251 and substantially recovers the original frequency domain data. Inverse DCT transform block 253 transforms the frequency domain data from inverse quantization block 252 back to the spatial domain. This spatial domain data supplies one input of adder 254. The other input of adder 254 comes from motion compensation prediction unit 255. Motion compensation prediction unit 205 applies the motion compensation computed by motion compensation prediction unit 208 and transmitted in the encoded data stream. Adder 254 recovers the predicted data.

In the decoder, the quantized DCT coefficients are reconstructed and inverse transformed to produce the prediction error. This is added to the motion-compensated prediction generated from previously decoded pictures to produce the decoded output.

In an MPEG-2 codec, the motion-compensated predictor shown in FIG. 2 supports many methods for generating a prediction. For example, the block may be forward predicted from a previous picture, backward predicted from a future picture, or bidirectionally predicted by averaging a forward and backward prediction. The method used to predict the block may change from one block to the next. Additionally, the two fields within a block may be predicted separately with their own motion vector, or together using a common motion vector. Another option is to make a zero-value prediction. This causes the source image block to be DCT coded rather than the prediction error block. For each block to be coded, the coder chooses between these prediction modes, trying to maximize the decoded picture quality within the constraints of the bit rate. The choice of prediction mode and the prediction error is transmitted to the decoder so it may regenerate the correct prediction.

Figure 3:
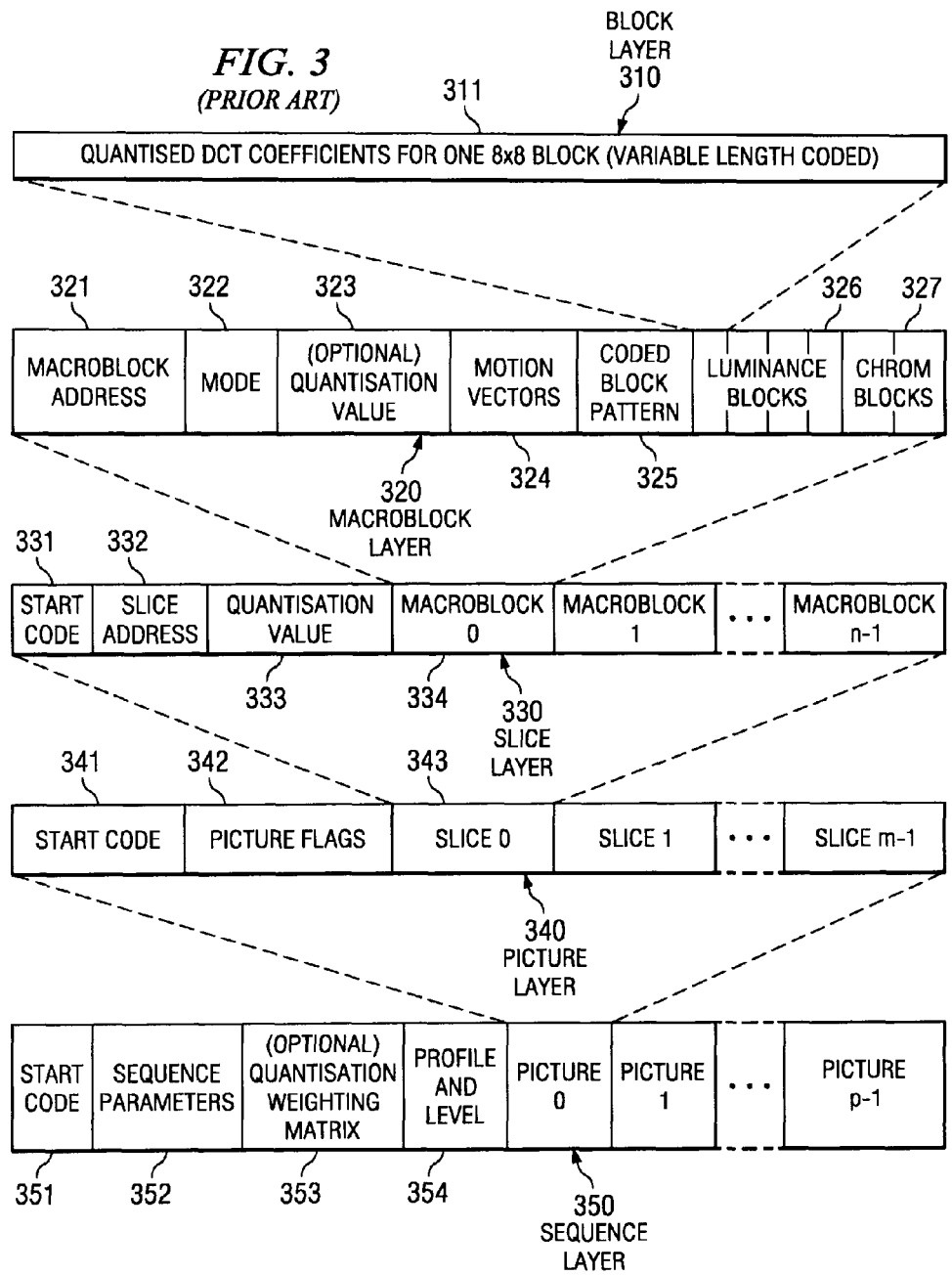
FIG. 3 shows the MPEG-2 bit stream structure (prior art)

FIG. 3 shows an outline of the MPEG-2 video bit stream structure. Block layer 310 consists of the quantized DCT coefficients block 311 for one block. Macroblock layer 320 consists of macroblock address 321, macroblock mode 322, an optional quantization value 323, motion vectors 324, coded block pattern 325, luminance blocks 326 and chrominance blocks 327. Each of luminance blocks 326 and chrominance blocks 327 is a quantized DCT coefficients block 311. In accordance with this example of 4:2:0 coding, there are 4 luminance blocks 326 and 2 chrominance blocks 327. Slice layer 330 consists of start code 331, slice address 322, quantization value 333 and n macroblocks 324, macroblocks 0 to n−1. Each macroblock 324 is a macroblock layer 320. Picture layer 340 consists of start code 341, picture flags 342 and m slices 342, slices 0 to m−1. Each slice 342 is a slice layer 330. Sequence layer 350 consists of start code 351, sequence parameters 352, optional quantization weighting matrix 353, profile and level data 354 and p pictures 355, pictures 0 to p−1. Each picture 355 is a picture layer 340. Thus sequence layer 350 includes p pictures 340, each picture includes m horizontal slices 330, each horizontal slice 330 includes n macroblocks 320 and each macroblock 320 includes plural luminance blocks and chrominance blocks 310.

In MPEG-2, three picture types are defined. The picture type defines which prediction modes may be used to code each block.

Intra pictures (I-pictures) are coded without reference to other pictures. Moderate compression is achieved by reducing spatial redundancy, but not temporal redundancy. They can be used periodically to provide access points in the bit stream where decoding can begin.

Predictive pictures (P-pictures) can use the previous I- or P-picture for motion compensation and may be used as a reference for further prediction. Each block in a P-picture can either be predicted or intra-coded. By reducing spatial and temporal redundancy, P-pictures offer increased compression compared to I-pictures.

Bidirectionally predictive pictures (B-pictures) can use the previous and next I or P pictures for motion-compensation, and offer the highest degree of compression. Each block in a B-picture can be forward, backward or bidirectionally predicted or intra-coded. To enable backward prediction from a future frame, the coder reorders the pictures from natural display order to bit stream order so that the B-picture is transmitted after the previous and next pictures it references. This introduces a reordering delay on decoding dependent on the number of consecutive B-pictures.

The different picture types typically occur in a repeating sequence termed a Group of Pictures (GOP). A typical GOP in display order is:

$B_1 B_2 I_3 B_4 B_5 P_6 B_7 B_8 P_9 B_{10} B_{11} P_{12}$

The corresponding bit stream order is:

$I_3 B_1 B_2 P_6 B_4 B_5 P_9 B_7 B_8 P_{12} B_{10} B_{11}$

A regular GOP structure can be described with two parameters: N is the number of pictures in the GOP, and M is the spacing of P-pictures. In the GOP of this example N=12 and M=3. MPEG-2 does not insist on a regular GOP structure. For example, a P picture following a scene change may be badly predicted since the reference picture for prediction is completely different from the picture being predicted. Thus it may be beneficial to code it as an I picture instead.

For a given decoded picture quality, coding using each picture type produces a different number of bits. In a typical sequence, a coded I picture is three times larger than a coded P picture, which is itself 50% larger than a coded B picture.

By removing much of the redundancy from the source images, the coder outputs a variable bit rate. The bit rate depends on the complexity and predictability of the source picture and the effectiveness of the motion-compensated prediction.

For many applications, the bit stream must be carried as a fixed bit rate stream. In these cases, a buffer must be placed between the coder and the output. The buffer is filled at a variable rate by the coder and emptied at a constant rate by the transmitted stream. A feedback mechanism is needed to adjust the average coded bit rate as a function of the buffer size and fullness to prevent the buffer from under or overflowing. For example, the average coded bit rate may be lowered by increasing the degree of quantization applied to the DCT coefficients. This reduces the number of bits generated by the variable-length coding, but increases distortion in the decoded image. The decoder must also have a buffer between the transmission channel and the variable rate input to the decoding process. The size of the buffers in the coder and decoder are the same.

MPEG-2 defines the maximum decoder (and hence coder) buffer size, although the coder may choose to use only part of the buffer. The delay through the coder and decoder buffer is equal to the buffer size divided by the transmission channel bit rate. For example, an MPEG-2 coder operating at 6 Mbits/sec with a buffer size of 1.8 Mbits would have a total-delay through the coder and decoder buffers of around 300 ms. Reducing the buffer size will reduce the delay, but may affect picture quality if the buffer becomes too small to accommodate the variation in bit rate from the coder VLC.

Most MPEG implementations contain a pre-filter to improve video quality by reducing artifacts caused by noise in the input signal. The amount of filtering is critical because excessive filtering will degrade the resultant image. Most implementations of the pre-filter depend on feedback to minimize such degradation.

Figure 4:
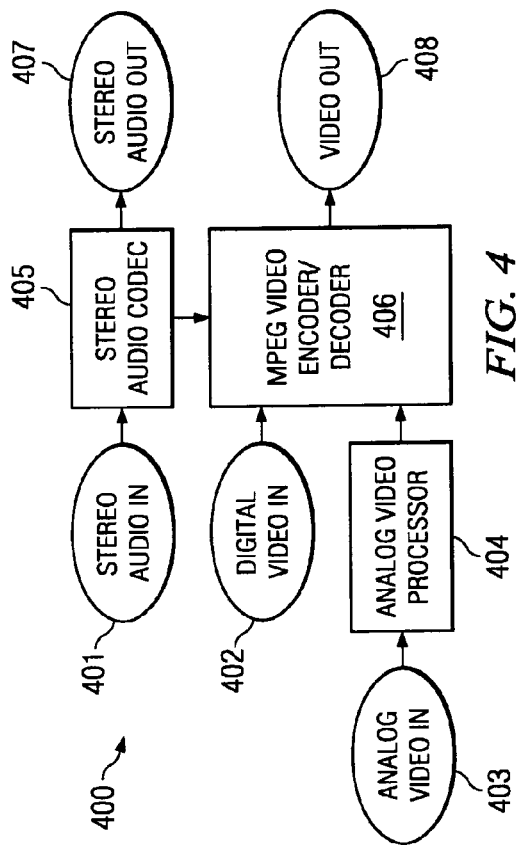
FIG. 4 is a block diagram of a digital video system to which this invention is applicable.

FIG. 4 is a block diagram of a system to which this invention is applicable. The preferred embodiment is a DVD recorder or a DVD player/recorder where the pre-filter of this invention is employed to improve the recorded video quality.

System 400 receives digital video data through digital video input 402. The digital video data may originate from a satellite receiver, digital cable interface, digital video camera, DVD playback or other sources. Alternately, analog video data from a VCR, analog video camera, analog cable interface or other sources may be supplied to analog video input 403. In this case, the analog video is digitized in analog video processor 404. In either case, the resultant digital video signal is further processed by MPEG video encoder/decoder 406. This processing may optionally comprise decryption of the data stream, authorization of conditional access to the date, decompression of the MPEG compressed data stream, audio/video synchronization by interaction with stereo audio decoder 405, color space conversion to/from YUV, RGB, component and composite video streams and other functions. The resulting video streams are output through video output 408 for display, storage or further processing.

Optionally separate mono or stereo audio signals may be supplied to stereo audio codec 405 from stereo audio input 401. The resultant processed audio as well as the audio processed by MPEG video encoder/decoder 406 may be output through stereo audio output 407.

The commonly implemented motion estimation of the prior art uses block matching to find the best position for motion compensation. The commonly used criterion to determine the best fit uses residual prediction error only. In other words, the block that has the least prediction error within the search range is selected. This approach tends to generate disarranged motion vectors and results in a large overhead for encoding the motion vectors. At low bit rates the extra overhead results in a degradation of the picture quality. This invention introduces a method that includes a motion vector overhead penalty into the criterion of the block matching. By introducing this penalty, motion vectors are arranged in an efficient manner and the overhead of encoding them is minimized, resulting in an improvement of the picture quality.

Figure 5:
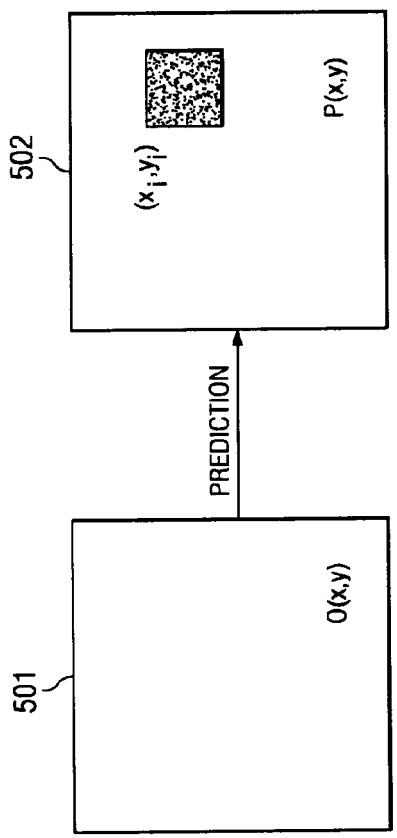
FIG. 5 illustrates the process of motion estimation.

FIG. 5 illustrates this process. The pixel value of picture 502 is denoted $P(x,y)$ and the position of the i-th macroblock in the picture is denoted $(x_i, y_i)$. The picture is motion-compensated from reference picture 501 denoted $O(x,y)$.

Prior art block matching uses residual prediction error as the evaluating function for selecting the best position. Therefore, it can be represented by the following equation for a motion vector $\vec{v}=(v_x, v_y)$:

$$E_i(\vec{v}) = \sum_{(x,y) \in search\ window} \left| O(x_i + v_x + x, y_i + v_y + y) - P(x_i + x, y_i + y) \right| \qquad (1)$$

Thus this cost function is the sum over the search window of the absolute value of the difference between displaced reference picture and the current picture. Generally, the motion vector $\vec{v}$ that minimizes this cost function $E_i(\vec{v})$ is selected.

A penalty term is added to this cost function to impose the penalty of motion vectors. This penalty represents the overhead of encoding the motion vector. The overhead depends on the difference of motion vectors so the evaluation function is defined as follows:

$$E'_i(\vec{v}, \vec{v}^{(i-1)}) = E_i(\vec{v}) + \Psi_i(\vec{v} - \vec{v}^{(i-1)}) \qquad (2)$$

where: $\Psi_i(\vec{d})$ denotes the penalty term of the i-th macroblock for a motion vector and it is a function of a difference of the current motion vector $\vec{v}$ from the previous macroblock ($\vec{v}^{(i-1)}$). The penalty term is an addition of the penalty of a horizontal difference of motion vectors ($d_x$) and that of a vertical difference ($d_y$) because the MPEG specification encodes a horizontal difference and a vertical difference independently.

$$\Psi_i(\vec{d}) = \phi_i(d_x) + \phi_i(d_y) \qquad (3)$$

The penalty of each component is defined as the following equation:

$$\varphi_i(d) = L(d) \cdot \frac{Q_i}{\alpha} \qquad (4)$$

where: $Q_i$ is the quantization parameter for the i-th macroblock; $\alpha$ is the constant of a fixed value that converts between the coefficient's absolute value and the number of bits, is set to 3.1383 [bit/level] analytically, but it can be set to 4 in practice; $L(d)$ is the number of bits to encode the vector difference d derived from the VLC table and the encoding scheme of motion vectors of the MPEG specification. This is summarized in Table 1.

TABLE 1

| $\left\lfloor \frac{|d|}{2^{fcode-1}} \right\rfloor$ | L(d) for a frame vector | L(d) for a field vector |
|---|---|---|
| 0 | 1 | 2 |
| 1 or 32 | 2 + f code | 3 + f code |
| 2 or 31 | 3 + f code | 4 + f code |
| 3 or 30 | 4 + f code | 5 + f code |

TABLE 1-continued

| $\left\lfloor \frac{|d|}{2^{\text{fcode}-1}} \right\rfloor$ | L(d) for a frame vector | L(d) for a field vector |
|---|---|---|
| 4 or 29 | 6 + f code | 7 + f code |
| 5-7 or 26-28 | 7 + f code | 8 + f code |
| 8-10 or 23-25 | 9 + f code | 10 + f code |
| 11-22 | 10 + f code | 11 + f code |

This formula gives the overhead of encoding a motion vector in terms of the number of bits. The following three steps convert this into the equivalent error value for incorporating them together in a single formula:

(1) Convert the number of bits into an equivalent level of quantized coefficients;
(2) Convert this into the equivalent level of pre-quantized coefficients; and
(3) Convert this into the equivalent prediction error.

This conversion requires the average codeword length per level (the value of a quantized coefficient) for converting the number of bits into the equivalent level. When the MPEG standard defined the VLC table for DCT coefficients there was an assumed probability distribution of the codewords. This information is not publicly available. The VLC definition of the MPEG standard itself may be used to estimate the distribution as follows.

Assume that each codeword is near-optimally defined according to its occurrence probability. Therefore, $$p_{r,l} = 2^{-|w_{r,l}|} \quad (5)$$

where: $|w_{r,l}|$ denotes the codeword length for run r and level l; and $p_{r,l}$ is the occurrence probability of the run and the level. However, as this is no more than an estimate, the coefficients are multiplied to this ideal value to reduce the error of the estimate:

$$p_{r,l} = \frac{1}{P} 2^{-|w_{r,l}|}, \quad (6)$$

$$P = \sum_{r=0}^{63} \sum_{l=-255}^{255} 2^{-|w_{r,l}|}$$

This correction normalizes the sum of the probability into one. By using this distribution, the estimated average code length per level is defined as:

$$\alpha = \sum_{r=0}^{63} \sum_{l=-2047}^{l=2047} p_{r,l} \frac{|w_{r,l}|}{l} = \frac{1}{\sum_r \sum_l 2^{-|w_{r,l}|}} \sum_r \sum_l 2^{-|w_{r,l}|} \frac{|w_{r,l}|}{l} \quad (7)$$

The actual codewords are available from the MPEG specification (MPEG-2 Table B-15) for DCT coefficients. This permits an estimate of the average codeword length per level as:

$$\alpha = 3.14 \text{ [bit/level]}. \quad (8)$$

Conversion from the overhead of a motion vector, L(d) [bit], into the equivalent quantized coefficient level is estimated as:

$$\text{equivalent quantized coefficient level} = \frac{L(d)}{\alpha} \quad (9)$$

MPEG-2 quantization for non-intra macroblocks is performed as follows. Let $ac_{m,n}$ to be an AC coefficient at (m,n) in block coordinate and $W_{m,n}$ to be the (m,n)-th element of the non-intra quantization matrix. Then, the quantization process can be represented as:

$$\frac{16 ac_{m,n} // W_{m,n}}{Q_i} \quad (10)$$

where: $Q_i$ denotes the quantization scale of the macroblock; // denotes the integer division with rounding to the nearest integer.

Assume that the default non-intra quantization matrix is used, in which all elements are set to 16. Then conversion from the overhead of a motion vector L(d) into the equivalent pre-quantized coefficient level can be estimated as:

$$\text{equivalent coefficient level} = L(d) \frac{Q_i}{\alpha} \quad (11)$$

MPEG specifications define a two-dimensional DCT, but this can be achieved by cascading one-dimensional DCT calculations. MPEG defines the DCT transform as shown in the following equation:

$$f(x) = \sqrt{\frac{2}{N}} \sum_{u=0}^{N-1} C(u) F(u) \cos \frac{(2x+1)u\pi}{2N}, \quad (12)$$

$$C(u) = \begin{cases} \frac{1}{\sqrt{2}} & (u = 0) \\ 1 & (u \neq 0) \end{cases}$$

where: f(x) is the signal in the spatial domain; and F(u) denotes the signal in the DCT domain.

As Parseval's equation holds true for the MPEG DCT, we can estimate the equivalent error for a given overhead L(d) by using the equation:

$$\text{equivalent error} = L(d) \frac{Q_i}{\alpha} \quad (13)$$

Figure 6:
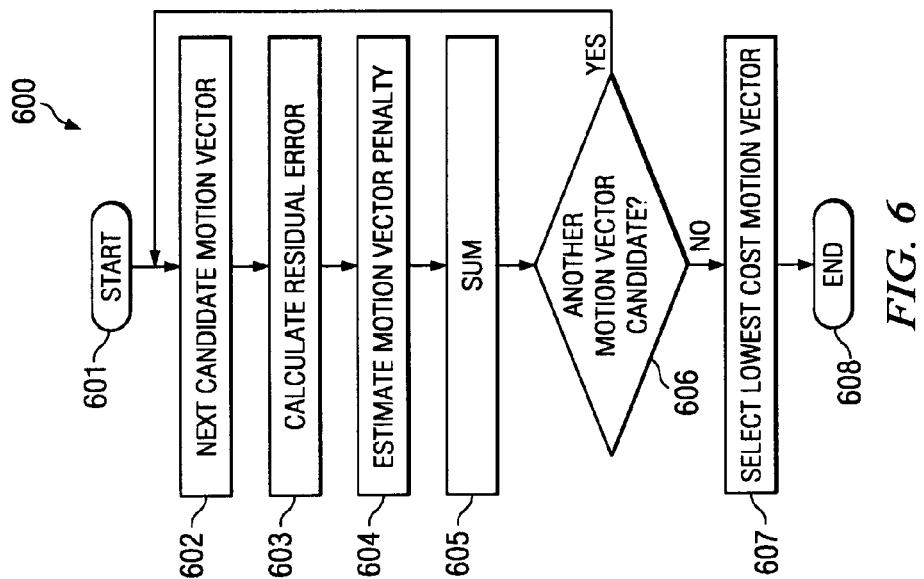
FIG. 6 is a flow chart illustrating the steps of motion vector selection according to this invention.

FIG. 6 is a flow chart illustrating process 600 of motion vector selection for a single macroblock according to this invention. Process 600 begins with start block 601. Block 602 selects the next candidate motion vector. Some encoders do an exhaustive search for the motion vector. It is possible to employ other techniques for a more focused search based upon intermediate candidates. Block 602 ensures that the motion vector selection process considers all candidate motion vectors according to the implemented search criteria.

Process 600 next calculates the residual error for that candidate motion vector (block 603). Block 603 uses Equation (1). Next block 604 estimates the motion vector penalty. One method of performing this estimation is described above in conjunction with Equations (3) to (13). Block 605 sums the residual error and the motion penalty as shown in Equation (2).

Decision block 606 determines in there is another motion vector candidate for this macroblock according to the search criteria. If so (Yes at decision block 606), the process 600 loops back to block 602 to consider the next candidate motion vector. If not (No at decision block 606), then block 607 determines the lowest cost candidate motion vector. This motion vector provides the lowest sum residual error and motion penalty according to Equation (2). This process thus attempts to determine the candidate motion vector resulting requiring the least number of bits to code the macroblock. As shown by Equation (2) this is a function both of the quality of match between the current macroblock and the reference macroblock $E_t(\vec{v})$ and the difference $\Psi_t(\vec{d})$ between the candidate motion vector $\vec{v}$ of the current macroblock and the previous motion vector $\vec{v}^{(i-1)}$ of the reference macroblock. Following this selection process 600 is complete for the current macroblock (end block 608). Larger outer loops are necessary to traverse all macroblocks in a single picture and all pictures in a video sequence.

Computer simulations show this invention provides quality improvements. In addition to the MPEG test sequences bicycle, cheerleaders, flower garden, football, mobile and calendar, and table tennis, these simulations included the following sequences: Minimoni, a music sequence with very fast motion; and The Fun, a converted movie sequence with moderate motion.

Table 2 compares the signal to noise ratio (SNR) of the encoded video stream with and without the motion vector penalty, showing the quality improvement for all the test sequences.

TABLE 2

| Bitrate | Sequence | Structure | SNR [dB] without penalty | SNR [dB] with penalty | difference [dB] |
|---|---|---|---|---|---|
| 5 Mbps | Bicycle | Frame | 29.2 | 29.8 | +0.6 |
| | | Field | 29.6 | 30.1 | +0.5 |
| | Cheer | Frame | 30.2 | 30.6 | +0.4 |
| | | Field | 30.0 | 30.3 | +0.3 |
| | Flower | Frame | 30.5 | 30.9 | +0.4 |
| | | Field | 30.3 | 30.7 | +0.4 |
| | Football | Frame | 35.2 | 35.6 | +0.4 |
| | | Field | 36.1 | 36.4 | +0.3 |
| | Mobile | Frame | 27.8 | 28.5 | +0.7 |
| | | Field | 27.1 | 27.5 | +0.4 |
| | Tennis | Frame | 32.2 | 32.6 | +0.4 |
| | | Field | 32.0 | 32.3 | +0.3 |
| | Minimoni | Frame | 27.6 | 28.1 | +0.5 |
| | | Field | 28.5 | 29.1 | +0.6 |
| | The Fun | Frame | 40.5 | 40.6 | +0.1 |
| | | Field | 40.8 | 40.9 | +0.1 |
| 2.5 Mbps | Bicycle | Frame | 24.2 | 26.3 | +2.1 |
| | | Field | 25.0 | 26.7 | +1.7 |
| | Cheer | Frame | 25.7 | 27.1 | +1.4 |
| | | Field | 25.6 | 26.7 | +1.1 |
| | Flower | Frame | 24.9 | 26.9 | +2.0 |
| | | Field | 25.2 | 26.7 | +1.5 |
| | Football | Frame | 29.9 | 32.2 | +2.3 |
| | | Field | 31.7 | 33.3 | +1.6 |
| | Mobile | Frame | 22.7 | 24.2 | +1.5 |
| | | Field | 22.2 | 23.4 | +1.2 |
| | Tennis | Frame | 27.1 | 29.6 | +2.5 |
| | | Field | 28.1 | 29.6 | +1.5 |
| | Minimoni | Frame | 22.3 | 24.2 | +1.9 |
| | | Field | 23.3 | 25.5 | +2.2 |
| | The Fun | Frame | 37.5 | 38.1 | +0.6 |
| | | Field | 37.6 | 38.4 | +0.8 |

The main advantage of applying the motion vector penalty is to correct the balance of DCT coefficients and motion vectors. In other words, a motion vector that has slightly larger prediction error than the best should be selected if the penalty for the motion vector compensates for the difference. This reduces the number of bits for encoding motion vectors and this reduction increases the allocation for DCT coefficients.

Figure 7:
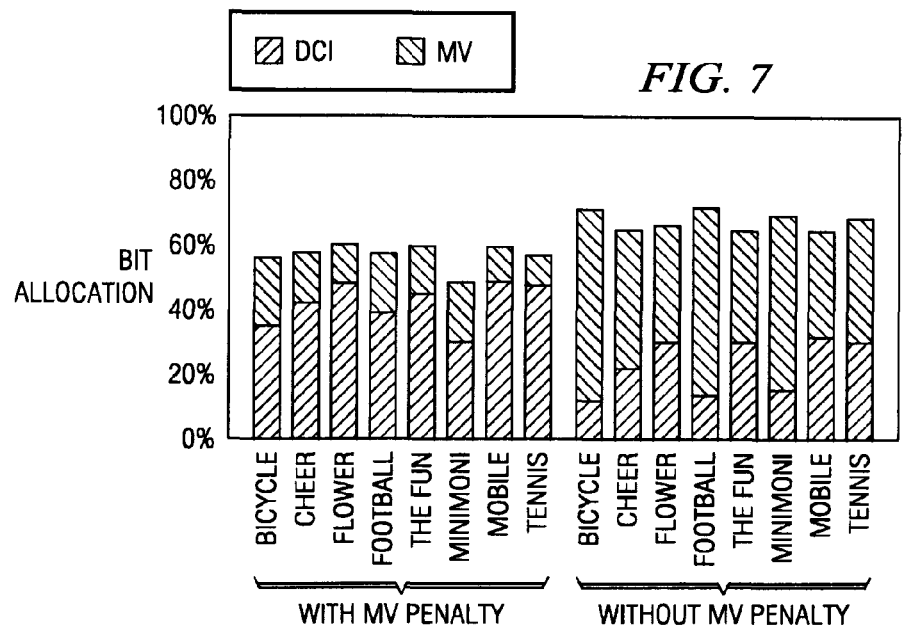
FIG. 7 shows a comparison of bit allocation between prior art and this invention.

FIG. 7 shows the ratio of bit allocation of DCT coefficients and motion vectors for all the test sequences for frame picture encoding at 2.5 Mbps. FIG. 7 shows that the number of bits used for motion vectors are significantly reduced allowing a corresponding increase of bits available for DCT coefficients.

In this invention, the evaluation function for a motion vector includes a penalty for coding the motion vector. Therefore, the motion type decision automatically takes into account the overhead of encoding motion vectors because the decisions are made based on the evaluation values. The following motion types have offset values that represent the overhead of extra motion vector(s) and reference field select bits.

(1) Unidirectional (forward or backward) field motion compensation in frame pictures (one extra motion vector and two field select bits);

(2) Bidirectional (interpolated) field motion compensation in frame pictures (three extra motion vectors and four field select bits);

(3) Bidirectional frame motion compensation in frame pictures (one extra motion vector);

(4) Unidirectional 16 by 8 motion compensation in field pictures (one extra motion vector and one field select bit);

(5) Bidirectional 16 by 8 motion compensation in field pictures (three extra motion vectors and three field select bits); and (6) Bidirectional field motion compensation in field pictures (one extra motion vector and one field select bit).

Figure 8:
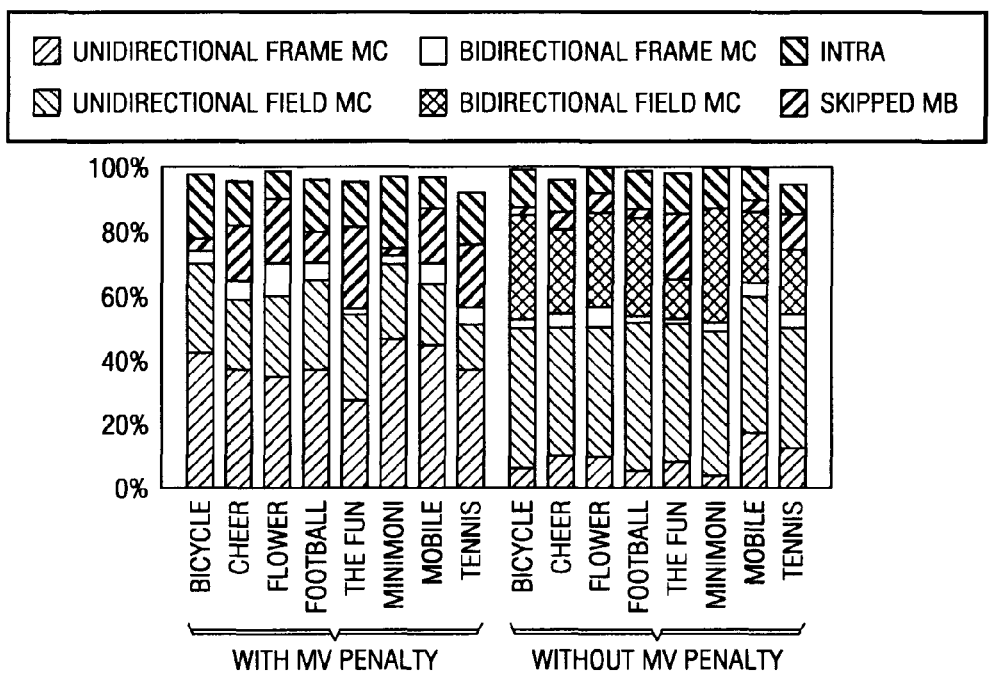
FIG. 8 shows the optimization of motion vector types in the prior art and according to this invention.

This invention corrects the balance of the motion vector type decision and results in an improved picture quality because unnecessary use of motion vector types that use multiple motion vectors is reduced. FIG. 8 compares the distribution of the motion vector types with and without the penalty with frame picture encoding at 2.5 Mbps.

As previously shown, the motion vector penalty increases the occurrence of frame motion compensation in case of frame pictures or field motion compensation in case of field pictures. This also causes motion vectors to be arranged, increasing the possibility of skipped macroblocks with the resultant increase of bits available for encoding coefficients. Data shown in FIG. 8 demonstrates this increase in the number of skipped macroblocks even though the quantization parameters are lower, resulting in a higher SNR.

What is claimed is:

1. A method of motion estimation in a digital video compression system comprising the steps of:
   segmenting the target picture into a grid of macroblocks;
   for each macroblock
      choosing for test a plurality of candidate motion vectors according to an implemented search criteria,
      for each candidate motion vector calculating a residual error between the macroblock and a reference macroblock displaced by a current candidate motion vector,
      for each candidate motion vector estimating a cost of coding said current candidate motion vector dependent upon a difference between said candidate motion vector and a motion vector from an immediately previous macroblock including separately determined cost of coding a horizontal difference of motion vectors and cost of coding a vertical difference of motion vectors,
      selecting one candidate motion vector providing a least number of bits to encode the macroblock dependent upon said calculated residual error and said cost of coding, and
   encoding the macroblock using the one selected candidate motion vector.

2. The method of claim 1, wherein:
said step of calculating a residual error employs the equation:

$$E_i(\vec{v}) = \sum_{(x,y) \in search\ window} \left| \begin{array}{c} O(x_i + v_x + x, y_i + v_y + y) - \\ P(x_i + x, y_i + y) \end{array} \right|$$

where: $O(x,y)$ is the value of the reference macroblock at location $(x,y)$; $P(x,y)$ is the value of the current macroblock; and $\vec{v}=(v_x,v_y)$ is the current candidate motion vector.

3. A digital video apparatus comprising:
a source of a digital video signal;
a digital signal processor connected to said source of a digital video signal programmed to:
choose for test a plurality of candidate motion vectors according to an implemented search criteria,
for each candidate motion vector calculate a residual error between the macroblock and a reference macroblock displaced by a current candidate motion vector,
for each candidate motion vector estimate a cost of coding said current candidate motion vector dependent upon a difference between said candidate motion vector and a motion vector from an immediately previous macroblock including separately determined cost of coding a horizontal difference of motion vectors and cost of coding a vertical difference of motion vectors,
select one candidate motion vector providing a least number of bits to encode the macroblock, and
encode the macroblock using the one selected candidate motion vector.

4. The digital video apparatus of claim 3, wherein:
said digital signal processor is programmed to calculate a residual error employing the equation:

$$E_i(\vec{v}) = \sum_{(x,y) \in search\ window} \left| \begin{array}{c} O(x_i + v_x + x, y_i + v_y + y) - \\ P(x_i + x, y_i + y) \end{array} \right|$$

where: $O(x,y)$ is the value of the reference macroblock at location $(x,y)$; $P(x,y)$ is the value of the current macroblock; and $\vec{v}=(v_x,v_y)$ is the current candidate motion vector.

* * * * *